United States Patent [19]
Muir et al.

[11] 3,744,823
[45] July 10, 1973

[54] HIGH TEMPERATURE PIPELINE JOINTS

[75] Inventors: John Muir; Ivan Marshall Payne, both of Rexdale, Ontario, Canada

[73] Assignee: Shaw Pipe Industries Ltd., Rexdale, Ontario, Canada

[22] Filed: Feb. 25, 1972

[21] Appl. No.: 229,400

[30] Foreign Application Priority Data
Mar. 1, 1971 Canada .............................. 106,476
Oct. 8, 1971 Belgium ............................ 109,111

[52] U.S. Cl. .................. 285/21, 285/47, 285/381, 285/423
[51] Int. Cl. .......................................... F16l 13/02
[58] Field of Search ................ 285/47, 45, 21, 294, 285/297, 423, 149, 53, 381

[56] References Cited
UNITED STATES PATENTS
3,297,819  1/1967  Wetmore ......................... 285/45 X
3,415,287  12/1968  Heslop et al. ...................... 285/381
3,492,029  1/1970  French et al. ......................... 285/47
3,642,308  2/1972  Zeile et al. ............................ 285/47

*Primary Examiner*—Dave W. Arola
*Attorney*—J. A. Legris

[57] ABSTRACT

A joint between pipe sections of a pipeline capable of operating at high temperatures has the adjacent pipe sections welded together. Prior to joining, each section can be passed, if necessary, through an apertured, rigid, water, impermeable end cap which can be welded to the respective pipe section. Located between the ends of the factory applied insulation, and surrounding the welded joint, is a sleeve of asbestos surrounded by a sleeve of polyurethane. Overlying and sealed to the polyurethane is a polyethylene sleeve, heat sealed in position.

11 Claims, 2 Drawing Figures

HIGH TEMPERATURE PIPELINE JOINTS

BACKGROUND OF THE INVENTION

1. Field of the Invention

This invention relates to pipelines, and more particularly to joints between pipe sections of a pipeline which is used to transport fluid materials at elevated temperatures.

The transportation of fluid materials at high temperatures through a pipeline has recently assumed commercial importance. One specific example of such a transportation is the recently developed technique for pipelining sulphur in a molten condition, at a temperature of about 310°F. There are unique problems associated with constructing a satisfactory pipeline for this purpose.

Such a pipeline must be thoroughly insulated from the surroundings, over its entire length, so as to maintain high temperatures within the pipeline, and protect it against corrosion. The most satisfactory material to use for insulating and protecting such a pipeline, in view of the properties required of the material, and particularly, the overall cost, is foamed polyurethane.

2. Description of the Prior Art

A drawback associated with foamed polyurethanes, however, is their reactivity towards water at temperatures above 220°F, i.e. steam. If steam contacts a foamed polyurethane, the foamed polyurethane rapidly disintegrates. The use of foamed polyurethane in an application where temperatures of 220°F and above are encountered, such as high temperature pipeline insulation, involves the risk of exposure of the polyurethane to steam and consequent disintegration thereof. Furthermore, the products formed by such decomposition of polyurethane will readily attack the steel of a pipeline.

In pipeline construction, it is necessary to make joints between pipe sections on site. The continuity of the pipeline insulation pre-applied at the factory is interrupted at each pipe section joint, where a special on-site joint and insulation means has to be applied. Such joints, involving interfaces between materials, provide possible locations at which water can, over extended periods of time, penetrate to the hot metal pipe. If this happens, steam will be formed and the foamed polyurethane insulation of the pipe attacked and destroyed.

SUMMARY OF THE INVENTION

The present invention provides a joint between two polyurethane coated sections of a pipeline capable of being used at temperatures of about 212°F and higher, which provides adequate heat insulation of the pipeline in the vicinity of such joint, substantially prevents ingress of water into contact with the pipe in the vicinity of the joint, and safeguards against the penetration of any water, or water vapour which might contact the pipe in the vicinity of the joint, into contact with the pipe insulation at locations away from the vicinity of the joint.

According to the present invention, therefore, there is provided a pipe joint comprising first and second pipe sections juxtaposed with one another, a polyurethane sleeve surrounding the juxtaposed ends of the pipe sections and a sleeve of thermoplastic resin surrounding the outer peripheral surface of the polyurethane sleeve and adhered thereto by means of a layer of water resistant sealant composition. If required, first and second apertured end caps of substantially water impermeable material can be fitted. When fitted, each of these surrounds and is in sealing engagement with its respective pipe sections, and is located at the juxtaposed end thereof, the end caps being in sealing engagement with the polyurethane sleeve, and the sleeve of thermoplastic resin being peripherally sealed to each of the end caps.

An additional cylindrical layer or sleeve of heat insulation material, for example asbestos, glass fiber or a cellular plastic material capable of withstanding the temperatures of the pipe, can advantageously be included between the pipe and the polyurethane sleeve, especially where the pipe is to be subjected to temperatures above about 275°F.

BRIEF DESCRIPTION OF THE DRAWINGS

In the drawings, like reference numerals indicate like parts.

DESCRIPTION OF THE PREFERRED EMBODIMENTS

Figure 1:
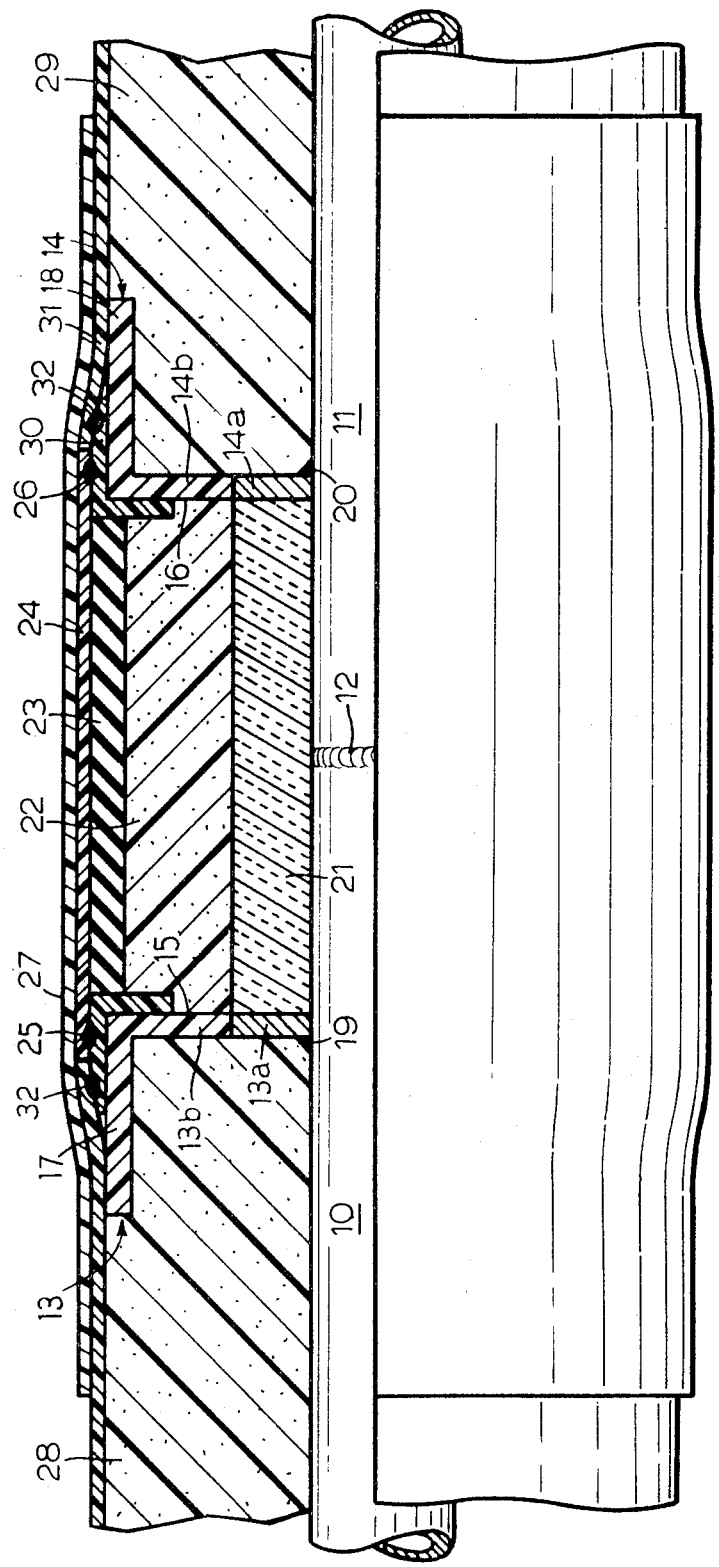
FIG. 1 is a longitudinal vertical section of a pipe joint in which end caps are employed.

When used, the end caps are preferably of a composite construction comprising an inner metal plate and an outer thermoset plastic plate. The respective pipe section is passed through the aperture in the metal portion and is sealed to the respective end cap by welding, these end caps having axially presented end faces in sealing engagement with the end faces of the polyurethane sleeve, and the inner layer or sleeve if one is provided. The end caps may also preferably have integral cylindrical skirt portions extending away from the justaposed ends of the pipe sections, the sleeve of thermoplastic material being heat sealed to the outer surfaces of said skirt portions, which are made of rigid thermoset plastic material covered on the outside surface with a thin layer (60–100 mils) of thermoplastic, such as high density polyethylene. The provision of rigid end caps of this nature has the additional advantage of providing firm surfaces, constraining the polyurethane and other compressive materials located between these surfaces, so as to facilitate the formation of adhesion or bonds involving such materials by the application of external pressure.

Especially preferred is a pipe joint as aforesaid in which the first and second pipe sections are axially connected by welding, and the whole joint assembly is overlayed by a water resistant thermoplastic sleeve, heat shrunk into tight engagement with the sleeve of thermoplastic resin, and overlying the ends thereof.

Such an arrangement provides the necessary continuous high quality insulation required to maintain the high temperatures within the pipeline. Water is substantially prevented from contacting the metal of the pipe sections in the vicinity of the joint, when the metal is hot or cold. As a further protection, however, the end caps, if fitted, prevent water attacking the insulation at locations remote from the joint. When end caps are used any destruction of insulation will therefore be limited to the vicinity of the joint and can be readily repaired. In addition such a pipe joint can readily be made on site, during installation of the pipeline.

The water resistant sealant composition conveniently comprises an ambient temperature curing liquid terminally halogenated polybutadiene, such as liquid dibromopolybutadiene described in Canadian Pat. No. 849,617, issued to Polymer Corporation LImited on Aug. 18, 1970, along with a curative therefor. Such a sealant composition comprises two liquid components, the polymer and the curing system, which can be mixed together immediately prior to application to the pipe joint. Then the composition cures in situ, at ambient temperatures to a water resistant, rubbery sealant composition. The curing system for such a polymer may comprise an amine or other suitable curative as disclosed in the aforementioned Canadian Pat. No. 849,617, or polyethyleneimine.

When using end caps, it is preferable to coat all the surfaces except the polyethylene of the outer surface of the skirt with the same or a similar liquid sealant composition immediately prior to assembly of the joint. By this means, these surfaces will be bonded to the polyurethane and inner insulation layer, when used, where they contact each other, by means of a waterproof sealant composition.

The polyurethane of the insulating sleeve is most suitably a rigid foamed polyurethane, of low density and a reasonably good compressive strength at low density. To provide adequate heat insulation it should have a low "K" factor. The specific form of polyurethane chosen should have regard to the temperatures which it would experience in contact with the pipe sections in the vicinity of the joint. For temperatures in excess of about 225°F, a specially thermally stabilized polyurethane or a high temperature modified polyurethane is preferred. Many examples of such high temperature modified polyurethanes are available on the market, mostly based upon isocyanurates instead of isocyanates. A specific example of a suitable high temperature modified polyurethane is HEXACAL (Trade Mark) marketed by Imperial Chemical Industries Limited.

Where the pipeline is to be operated at temperatures in excess of about 275°F, it is preferred to include an innermost sleeve of asbestos or similar insulant, as previously described, between the pipe and the polyurethane sleeve, since most high temperature modified polyurethanes are susceptible to such high temperatures. Thermasbestos, a trade name for a calcium silicate/asbestos fiber composition, is a particularly suitable material for use as such inner sleeve or layer. Such a layer prevents subjection of the polyurethane to excessively high temperatures from the pipeline.

In assembling the joint it is preferred to fuse the sleeve of the thermoplastic resin to the plastic outer surface of the plant applied polyethylene jacket insulation of each of the pipe lengths at the ends in closest proximity to the joint area. This is conveniently performed on the site by one of two methods; either by embedding a resistance wire circumferentially in each end of such a sleeve with protruding ends and passing an electric current through the said resistance wire, thereby melting the plastic and heat sealing the sleeve to the plant applied outer jacket. Alternatively, if end caps are used, the resistance wire can be embedded in the thermoplastic covering on the end cap. An arc welder, normally to be found on-site during the installation for welding the pipe sections, provides a convenient source of electrical supply for such sealing. A second preferred method for fusing the sleeve of the thermoplastic resin to the plant applied insulation, or the end cap, is by a fusion technique, in which a heated gas stream such as air or an inert gas is directed onto the joint area in a manner so as to soften the material of the sleeve and the factory applied insulation or the end cap surface. Then a strip of thermoplastic material is applied to the two materials to be joined. In this way a seamless, completely fused surface is produced, which is impervious to water.

Preferred embodiments of the pipe joint according to the invention will now be described for purposes of illustration, with reference to the accompanying drawings.

Two steel pipe sections 10 and 11 are arranged in axial alignment and mutually parallel, their ends being in abutment and welded together as at 12. With reference to FIG. 1 the pipe sections 10 and 11 are provided with end caps 13 and 14, located about 7-8 inches from the welded joint 12, the end caps having axially presented end faces 15 and 16 respectively and integral cylindrical skirt portions, 17 and 18 respectively, extending away from the welded joint 12. Such end caps are of a composite structure having an inner disc-like portion 13a, 14a of steel and an outer portion 13b, 14b, constituting the outer disc of the end face, and the skirt, of thermoset plastic such as phenolic resin. The provision of a resin portion prevents substantial heat losses through the end cap.

The end faces of the end caps are apertured, at 19 and 20 respectively, the pipe sections 10 and 11 passing through these apertures and being welded to the end caps at such positions, thereby preventing the passage of water from one side of the end faces 15 and 16 to the other, through the apertures 19 and 20. Overlying the corner of the end caps, i.e. at the joint between the end faces and the skirt portion is a layer of high density polyethylene 30, about 60 mils thick.

Surrounding the welded pipe section joint 12 is a cylindrical layer of insulating material 21, e.g., an asbestos composition, of generally cylindrical form. The layer 21 extends axially between the end faces 15 and 16 of the two end plates, and the end faces of the layer 21 are arranged to be in sealing engagement with said end faces. The wall thickness of the layer 21 is normally about 1½ inches.

Radially outwardly of the layer 21 is disposed a generally cylindrical sleeve 22 of modified polyurethane. The sleeve 22 is arranged to be of substantially the same length as the layer 21, so that it too extends between and is in sealing engagement with the end faces 15 and 16 of the respective end plates 13 and 14. Also, the polyurethane sleeve 22 has cross sectional dimensions such as to make it a tight fit, in sealing engagement, over the insulating layer 21. The wall thickness of the sleeve 22 is normally about 2½ inches, but depending upon operating conditions and specific type of urethane used, can vary between 1 and 4 inches, for example.

Next radially outwardly of the polyurethane sleeve 22 is disposed a layer of cured sealant composition 23. This sealant composition after curing serves to adhere the outer surface of the polyurethane sleeve 22 to a cylindrical thermoplastic sleeve 24 of high density polyethene which overlies the sleeve 22 and extends a short distance axially beyond the ends thereof. The polyethylene sleeve 24 is located radially outwardly of the end caps 13 and 14, and to a small extent overlies the thermoset cylindrical skirt portion 17 and 18 of the end caps, and is in tight overlying engagement with the polyethylene layer 30.

The sealant composition 23 which fills the space between the polyurethane sleeve 22 and the polyethylene sleeve 24 is a di-terminally brominated polybutadiene cured to a rubbery, resilient, water-proof condition in situ. It is applied to the outer surface of the polyurethane sleeve 22 during fabrication of the pipe joint as a liquid composition, prepared by mixing the liquid dibromopolybutadiene with a suitable liquid curing composition (for example a polyethyleneimine) immediately prior to its application to the pipe joint assembly. Then the polyethylene sleeve 24 is applied over this sealant composition, and the sealant layer 23 cures in situ, at ambient temperature over a period of some 24 hours, to a solid, rubbery, water-proof composition bonding the sleeve 24 to the sleeve 22.

The high density polyethylene sleeve 24 is heat sealed to the polyethylene layer 30 on the thermoset resin skirt portions of the end caps 17 and 18, at 25 and 26, by a heat seal extending circumferentially around the skirt portions. In assembling the joint, this is achieved by embedding a resistance wire in the layer 30, extending circumferentially at the desired locations, with protruding ends. Then after assembly of the joint, with the sealant composition 23 applied to the outer surface of the polyurethane sleeve 22 and the polyethylene sleeve 24 in position thereover, the ends of the resistance wires are connected to an electrical supply (conveniently an arc welder), whereupon the resistance wires are heated, melting the polyethylene and forming the circumferential heat seals 25 and 26. These heat seals effectively prevent ingress of moisture through the ends of the sleeve 24.

Overlying the whole assembly of end caps 13 and 14 and heat sealed polyethylene sleeve 24 is a further thermoplastic sleeve 27 which is heat shrunk into tight engagement with the sleeve 24 and overlies its ends. This heat shrunk sleeve is of cross-linked polyethylene.

All of the surfaces of the end caps 13 and 14 except the polyethylene 30 on the outer surface of the skirts, are, immediately prior to assembly of the joint, coated with a thin layer of the sealant compositions similar to or the same as that comprising the layer 23. This coating cures in situ to improve the seals between the end caps and the various resinous components of the assembly.

Over the major portions of their lengths, away from the immediate proximity of the joint 12, the pipe sections 10 and 11 are insulated by means of factory applied insulation comprising polyurethane layers 28 and 29 in the conventional manner, overlaid by an outer polyethylene jacket 31. The polyurethane layers 28 and 29 are dimensioned so as to fit snugly at their ends within the skirt portions 17 and 18 of the end caps, and to be in sealing engagement with the skirt portions 17 and 18 and the end faces 15 and 16 thereof. The outer polyethylene jacket 31 fits snugly over the skirt portions 17 and 18 of the end caps, so that it is in close, substantially sealing engagement with the polyethylene layer 30, and abuts the end of the sleeve 24. The jacket 31 is heat sealed in the same manner as the sleeve 24 to the polyethylene layer 30, at 32. The polyethylene layer 30 to which the sleeve 24 and jacket 31 are heat sealed is capable of a small amount of relative sliding in relation to the end caps, without upsetting the sealing nature of the joint as a whole. This is desirable so as to allow for expansion and contraction of the pipe sections, and hence movement of the end caps, without imposing undue strain on the long continuous protective jacket 31. The outermost thermoplastic sleeve 27 extends over and is heat shrunk onto the polyethylene jacket 31.

Figure 2:
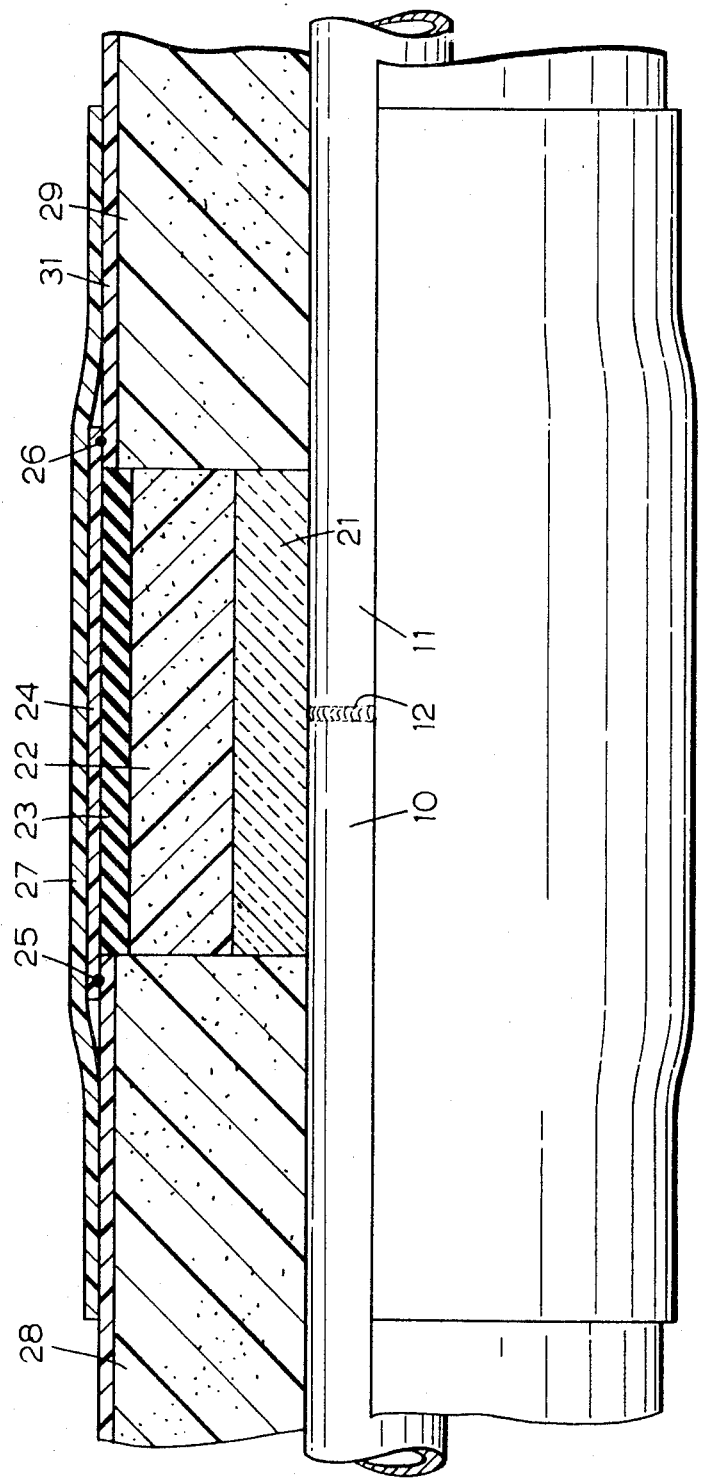
FIG. 2 is a vertical section of a pipe joint embodiment in which end caps are not used.

With reference to the embodiment illustrated in FIG. 2, this is generally as shown in FIG. 1 except that the composite end caps 13 and 14 are omitted. The insulating layer 21 and the modified polyurethane sleeve 22 extend between the end faces of the factory applied insulation layer 28 and 29. The polyethylene sleeve 24 is heat sealed to the polyethylene jacket 31 of the factory applied insulation, on each of the pipe lengths. The sealant composition 23 is in sealing relationship with the butt ends of the polyethylene jacket 31.

What we claim to be our invention is:

1. A pipe joint comprising first and second pipe sections axially aligned and juxtaposed with one another;
   a polyurethane sleeve surrounding the juxtaposed ends of the pipe sections;
   a sleeve of thermoplastic resin surrounding the outer peripheral surface of the polyurethane sleeve and adhered thereto by means of a layer of water resistant sealant;
   the sleeve of thermoplastic resin being peripherally sealed to structure associated with and in sealing engagement with the outer most layer of the pipe sections, so as effectively to prevent moisture ingress into contact with the pipe section ends.

2. The pipe joint of claim 1 wherein a generally cylindrical layer of insulating material is provided between the pipe sections and the polyurethane sleeves.

3. The pipe joint of claim 1 wherein the sleeve of thermoplastic resin is sealed to said structure by heat sealing, said heat sealing being accomplished by embedding a resistance wire in the layer of thermoplastic and passing electric current therethrough.

4. The pipe joint of claim 1 wherein the water resistant sealant composition comprises an ambient temperature curing, liquid, terminally halogenated polybutadiene, and a curative therefor, said composition having been cured in situ into a water resistant, rubbery sealant composition.

5. The pipe joint of claim 1 wherein first and second apertured end caps of substantially water impermeable material are provided, each surrounding and in sealing engagement with a respective pipe section, and located near the juxtaposed ends thereof, the end caps being sealing engagement with the polyurethane sleeve.

6. The pipe joint of claim 5 wherein the end caps have axially presented end faces in sealing engagement with the end faces of both the polyurethane sleeve and the insulating layer, the polyurethane sleeve being of rigid foamed polyurethane, and the end caps have integral cylindrical skirt portions extending away from the juxtaposed ends of the pipe sections, the sleeve of thermoplastic material being heat sealed to the outer surface of said skirt portions.

7. The pipe joint of claim 6 wherein the end caps are of composite construction, having a metal portion and a rigid thermoset plastic portion, the respective pipe sections passing through the apertures in the end caps and being sealed to the respective end cap by welding.

8. The pipe joint of claim 7 wherein the skirt portions are of rigid thermoset resin, and have over the outer surfaces thereof a layer of thermoplastic, to which the sleeve of thermoplastic material is heat sealed.

9. The pipe joint of claim 8 wherein the insulating layer contains asbestos.

10. The pipe joint of claim 8 wherein the sleeve of thermoplastic resin is of high density polyethylene.

11. The pipe joint of claim 1 wherein the whole pipe joint assembly is overlaid by a water resistant thermoplastic sleeve, heat shrunk into tight engagement with the sleeve of thermoplastic resin, and overlying the ends thereof.

* * * * *